United States Patent
Solki et al.

(10) Patent No.: US 9,645,626 B2
(45) Date of Patent: May 9, 2017

(54) CIRCUITS AND METHODS PROVIDING SUPPLY VOLTAGE CONTROL BASED ON TRANSIENT LOAD PREDICTION

(71) Applicant: QUALCOMM Incorporated, San Diego, CA (US)

(72) Inventors: Shahin Solki, San Diego, CA (US); Farsheed Mahmoudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/938,655

(22) Filed: Nov. 11, 2015

(65) Prior Publication Data

US 2016/0132084 A1    May 12, 2016

Related U.S. Application Data

(60) Provisional application No. 62/078,796, filed on Nov. 12, 2014.

(51) Int. Cl.
*G06F 1/26* (2006.01)
*G06F 1/32* (2006.01)
(Continued)

(52) U.S. Cl.
CPC .............. *G06F 1/26* (2013.01); *G06F 1/3296* (2013.01); *H02M 3/157* (2013.01);
(Continued)

(58) Field of Classification Search
CPC ........ G06F 1/26; G06F 1/3296; H02M 3/157; H02M 3/1588
(Continued)

(56) References Cited

U.S. PATENT DOCUMENTS 7,562,245 B1    7/2009  Cai et al.
2008/0133180 A1  6/2008  Floyd et al.
(Continued)

FOREIGN PATENT DOCUMENTS

EP    2642650 A1    9/2013

OTHER PUBLICATIONS

Enpirion Power Datasheet EC7401QI 4-Phase PWM Controller with 8-Bit DAC Coden, Mar. 14, 2014 (Mar. 14, 2014), pp. 1-44, XP055250229, Retrieved from the Internet: URL:https://www.altera.com/content/dam/altera-www/global/en_US/pdfs/literature/ds/ds-1045_ec7401qi.pdf [retrieved on Feb. 15, 2016].
(Continued)

*Primary Examiner* — Robert Cassity
(74) *Attorney, Agent, or Firm* — Haynes and Boone, LLP

(57) ABSTRACT

An apparatus and method are disclosed for providing voltage control at a load of a buck converter. The buck converter is in a feedback loop so that a reference voltage determines a pulse width modulated (PWM) signal that is fed to the buck converter, and an output voltage of the buck converter is fed back to a PWM control circuit to maintain a value of the output voltage. The load at the buck converter provides event counters to a transient load current prediction circuit, which uses a curve fitting algorithm or other adaptive control algorithm to predict a change in current at the load. The transient load current prediction circuit then manipulates the reference voltage in accordance with the predicted change in current at the load.

28 Claims, 4 Drawing Sheets

(51) Int. Cl.
    *G06F 1/00*      (2006.01)
    *H02M 3/157*      (2006.01)
    *H02M 3/158*      (2006.01)
    *H02M 1/00*      (2006.01)

(52) U.S. Cl.
    CPC .. *H02M 3/1588* (2013.01); *H02M 2001/0025* (2013.01); *Y02B 70/1466* (2013.01)

(58) Field of Classification Search
    USPC ................................................ 713/320, 300
    See application file for complete search history.

(56) References Cited

U.S. PATENT DOCUMENTS

| | | | | |
|---|---|---|---|---|
| 2008/0157745 | A1* | 7/2008 | Nakata | G06F 1/26 323/304 |
| 2008/0301474 | A1 | 12/2008 | Bussa et al. | |
| 2010/0205384 | A1* | 8/2010 | Beaumont-Smith | G06F 12/0862 711/154 |
| 2011/0154068 | A1 | 6/2011 | Huang et al. | |
| 2013/0241513 | A1* | 9/2013 | Trautmann | G05F 1/618 323/283 |
| 2014/0266141 | A1* | 9/2014 | Isham | H02M 3/157 323/318 |

OTHER PUBLICATIONS

International Search Report and Written Opinion—PCT/US2015/060471—ISA/EPO—Feb. 24, 2016.
Rajamani K., et al., "Application-Aware Power Management," IEEE International Symposium on Workload Characterization, 2006, pp. 39-48.
Sinha S., "Neuromorphic Controller for Low Power Systems from Devices to Circuits," Dec. 2011, 99 pages.
Second Written Opinion from International Application No. PCT/US2015/060471, mailed Oct. 25, 2016, 8 pages.

* cited by examiner

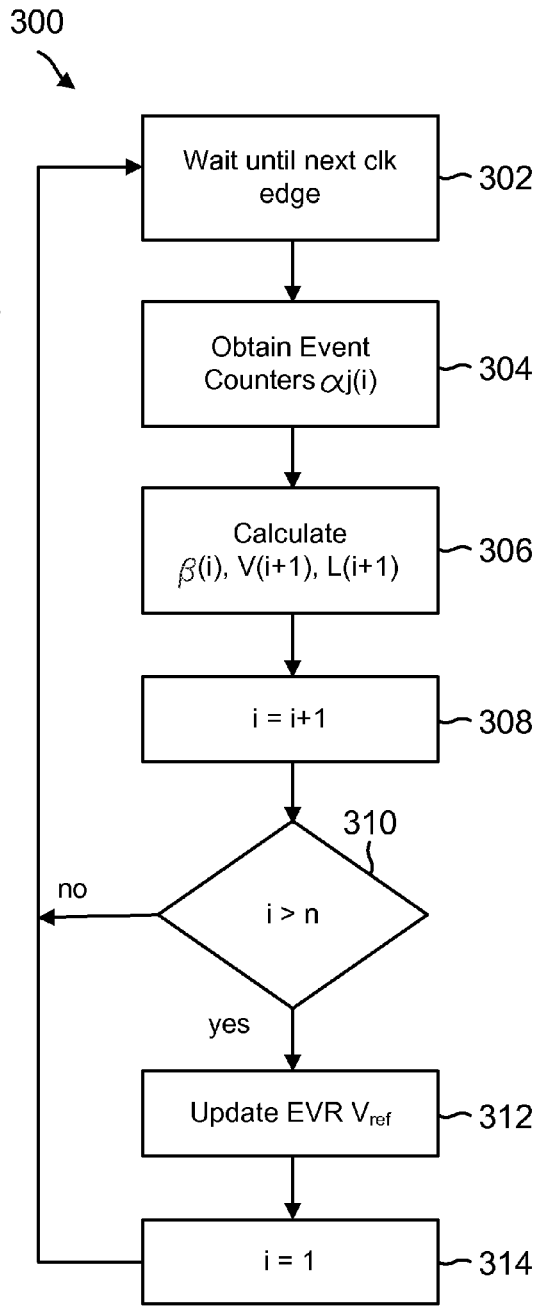

*i* is clock cycle number

α$_j$(i) are event counters at clock cycle *i*

*j* denotes number of event counters

β(i) is the aggregated value of the event counters

L(i+1) is the predicted (estimated) load current for the next cycle

V(i+1) = p*L(i+1)+q , where *p* and *q* are design dependent constants.

*n* is the max update rate for Vref pin

Δβ(i) = β(i) - β(i-1)

ΔL(i+1) = $K_p$Δβ(i) + $K_i$∫Δβ(i) dt + $k_d \frac{d}{dt}$Δβ(i)

L(i+1) = M(i) + ΔL(i+1)

Where, $K_p, K_i$, and $K_d$ are proportional, integral and differential coefficients of the PID algorithm (respectively), and M(i) is the actual load current for a clock cycle *i*.

$K_p, K_i$, and $K_d$ may be predetermined (during characterization and calibration), and in mission mode they may be uploaded from memory.

FIG. 3

| Cycle i | $\Delta\beta(i)$ | $\Delta L(i+1)$ | $\Delta V(i+1)^*$ | $\Delta M(i)$ | $\Delta E$ |
|---|---|---|---|---|---|
| 1 | 2 | 4 % | 2 | -- | -- |
| 2 | 1 | 2 % | 0 | 2 % | +2 % |
| 3 | 1 | 2 % | 1 | 2 % | 0 |
| 4 | 3 | 6 % | 4 | 4 % | -2 % |

FIG. 4

CIRCUITS AND METHODS PROVIDING SUPPLY VOLTAGE CONTROL BASED ON TRANSIENT LOAD PREDICTION

CROSS REFERENCE TO RELATED APPLICATIONS

The present application claims priority to and the benefit of the U.S. Provisional Patent Application No. 62/078,796, filed Nov. 12, 2014, which is hereby incorporated by reference in its entirety.

TECHNICAL FIELD

This application relates to voltage converters and, more specifically, to feedback control of voltage converters based on transient load predition.

BACKGROUND

In an example conventional system, a voltage regulator outputs a voltage to a load, such as a graphics processing unit (GPU), central processing unit (CPU), a modem, or the like. The load is designed to receive a substantially constant voltage from the voltage regulator. However, as power consumption increases at the load, output voltage may temporarily droop. Also, as power consumption decreases at the load, output voltage may have a temporary overshoot. Of course, the voltage regulator attempts to maintain the voltage at the desired value, so that voltage eventually returns to the desired value after some amount of time. But the temporary droop or overshoot may result in operating errors or wasted power.

Conventional voltage regulators use a feedback loop that compares the output voltage at the load to a reference voltage. However, such feedback loops are reactive, ameliorating voltage issues only after they are detected.

BRIEF DESCRIPTION OF THE DRAWINGS

FIG. 3 is an illustration of a flow diagram of an example method of proactively supplying voltage tuning according to one embodiment.

FIG. 4 is a chart illustrating an example number of clock cycles according to one embodiment of implementing the method of FIG. 3.

DETAILED DESCRIPTION

Disclosed herein are embodiments of a circuit and methods for providing supply voltage tuning proactively based on transient load current prediction. In one example, a voltage regulator outputs a voltage to a load, such as a graphics processing unit (GPU), central processing unit (CPU), a modem, or the like. The load is designed to receive a substantially constant voltage from the voltage regulator. However, as power consumption increases at the load, output voltage may temporarily droop. Also, as power consumption decreases at the load, output voltage may have a temporary overshoot. Of course, the voltage regulator attempts to maintain the voltage at the desired value, so that voltage eventually returns to the desired value after some amount of time.

Various embodiments disclosed herein include a circuit that provides an estimated predicted transient load based on event counters (or other indications of load power consumption). The predicted transient load can be used to determine whether the output voltage should be manipulated up or down to proactively minimize droop and overshoot events. In one example, a transient load current prediction circuit receives event counters from the load, predicts an estimated transient load, and then manipulates a reference voltage up or down based on the predicted transient load. In another example, the transient load current prediction circuit predicts the estimated transient load and increases or decreases the output voltage in parallel to a feedback loop set by the reference voltage, so that the reference voltage itself is not manipulated. In the examples below, transient load current prediction is shown as being applied to a voltage regulator that includes a buck converter. However, the scope of embodiments is not limited to buck converter voltage regulators, as other embodiments may include other types of voltage regulators, such as a linear regulator, a switched-regulator, and the like.

Figure 1:
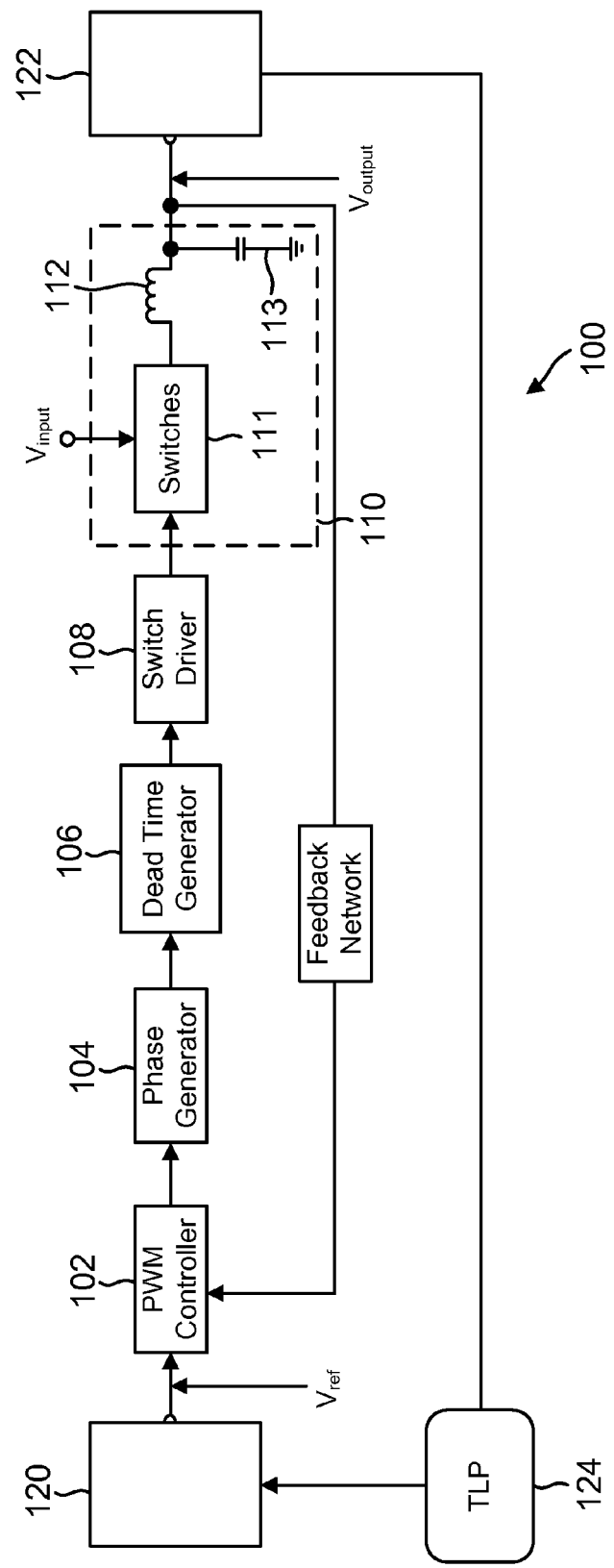
FIG. 1 is an architectural diagram illustrating example feedback loop for providing a constant, or nearly constant, output voltage according to one embodiment.

FIG. 1 is an architectural diagram illustrating an example system having two feedback loops for providing a constant, or nearly constant, Voutput to load 122. In the outer control loop, load 122 provides an indication of its activity (for example, event counters) to transient load current prediction (TLP) circuit 124. TLP 124 predicts an appropriate adjustment for Vref and sends digital data corresponding to that adjustment to digital analog converter (DAC) 120. DAC 120 then adjust Vref. The outer control loop is discussed in more detail below with respect to FIG. 2.

Looking at the inner control loop, PWM controller 102 receives the reference voltage (Vref) and a feedback signal providing a value of Voutput and outputs a PWM signal in response to a difference between Vref and Voutput. The PWM controller 102 modulates the PWM signal by adjusting the duty cycle of the PWM signal. In general, a larger duty cycle of the PWM signal increases a voltage at the output of synchronous buck converter 110, and a smaller duty cycle of the PWM signal decreases a voltage at the output of synchronous buck converter 110. In this way, PWM controller 102 continually adjusts the duty cycle of the PWM signal to keep Voutput nearly constant.

Phase generator 104 receives the PWM signal from PWM controller 102 and processes the PWM signal by adjusting its phase or producing multiple different signals with different phases. For instance, phase generator 104 may produce different signals for coupled inverters or may produce different signals for a multi-phase buck converter. In some embodiments, circuits 102 and 104 may be provided as part of a centralized controller, and circuits 106, 108, and 110 illustrate a single phase of a multi-phase buck converter and are part of a module that is separate from the centralized controller. FIG. 1 illustrates only a single phase, but it is understood that in some embodiments, there are multiple phases and multiple modules, each module belonging to a particular phase, and the centralized controller switches the modules on and off according to logic. Further in some embodiments, the centralized controller and the multitude of modules may all be on the same semiconductor die.

Dead time generator 106 receives the PWM signal and outputs two control signals for each phase of the multi-phase buck converter. Each phase of the synchronous buck converter 110 includes two banks of switch legs 111, and each one of the banks of switch legs corresponds to a respective control signal produced by dead time generator 106. A phase difference between the first control signal and the second control signal affects the timing of operation of the banks of switch legs 111, thereby defining a dead time in synchronous buck converter 110 to avoid or reduce shoot-through and body diode loss.

The two control signals are output from dead time generator 106 and received by switch driver 108. Switch driver 108 includes buffer drivers, which increase a power of each of the control signals in order to provide adequate power to turn on and off the switches 111 within buck converter 110.

Buck converter 110 receives Vinput, which in some embodiments is a power signal from a power rail on a semiconductor die. In other embodiments, Vinput may include power from a battery or other voltage source. The switching legs 111 open and close according to the control signals from switch driver 108. The operation of the switching legs 111, inductor 112, and capacitor 113 provide a steady output voltage at Voutput. Synchronous buck converter 110 may include any synchronous buck converter now known or later developed and may include in some embodiments a conventional synchronous buck converter 110 that reduces the voltage from Vinput according to a duty cycle of the received control signals. If Voutput drops or increases, the change in voltage is seen by PWM controller 102, which adjusts a duty cycle of the PWM signal to return the voltage at Voutput to a desired level. Similarly, $I^2R$ power losses within the system 100 of FIG. 1 affect the operation of the feedback loop. Specifically, $I^2R$ losses in the system components cause PWM controller 102 to increase the duty cycle of the PWM signal enough to account for those losses.

As noted above, the embodiment of FIG. 1 shows switching legs 111, and some embodiments may include multiple switching legs per phase. For instance, one embodiment includes two banks of switching legs. A first bank of switching legs includes PMOS transistors, and a second bank of switching legs includes NMOS transistors. Each NMOS transistor corresponds to one respective PMOS transistor, and for each leg that can be selected, that leg includes a corresponding NMOS and PMOS transistor together. Thus, the legs are each in parallel and each leg includes one PMOS and one NMOS transistor. Since the legs are in parallel, more legs allows for more current through the buck converter. Generally, as more current is consumed, more legs can be turned on, and as less current is consumed, legs can be turned off.

Also as mentioned above, some embodiments include multiple phases. Each of the buck converter phases are individually selectable, and each one handles some amount of current. Generally, as the load draws more current, the system can add more phases, and as current consumption by the load goes down, the system can reduce the number of phases that it uses. The inner control loop and voltage converter of FIG. 1 are an illustration of one type of voltage regulator in which embodiments of the disclosure may be implemented. However, the scope of embodiments may include any appropriate voltage regulator.

Figure 2:
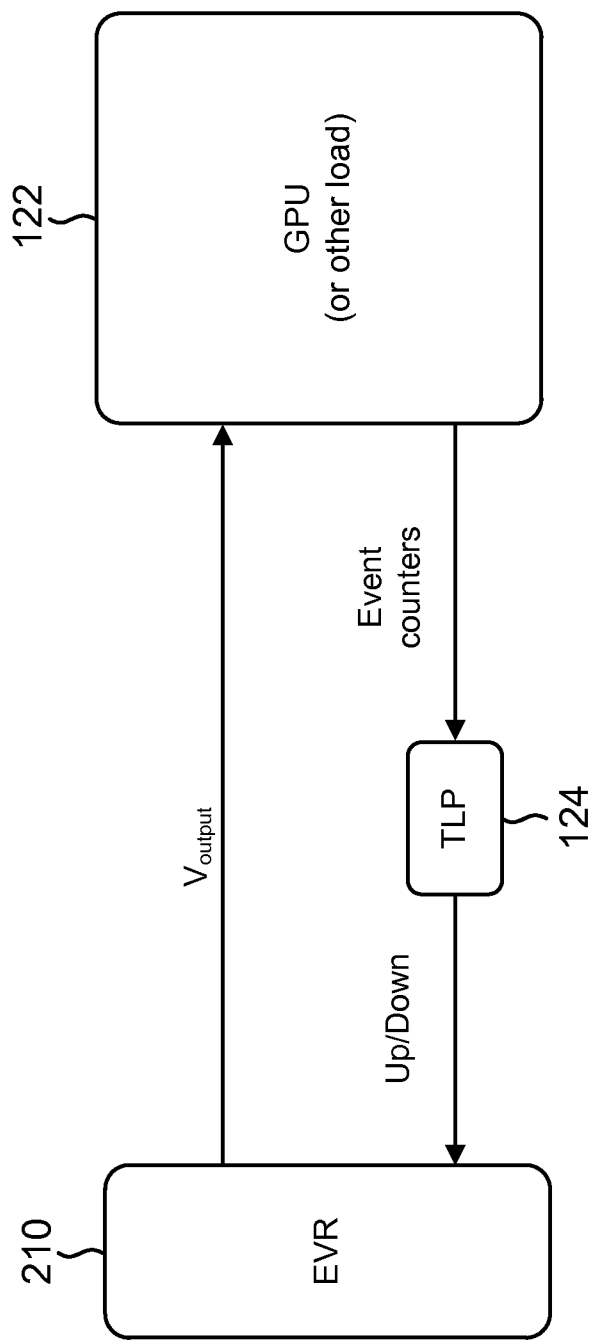
FIG. 2 is an example illustration of an outer feedback loop of the embodiment of FIG. 1.

FIG. 2 is another way of illustrating the outer feedback loop of the embodiment of FIG. 1. In system on chip (SOC) embodiments, load 122 may include, for example, a processing core, a modem, or the like. However, the scope of embodiments is not limited to SOCs. In this example, load 122 is shown as a graphics processing unit (GPU), however the scope of embodiments is not limited to any particular load, and may instead include any logic element that receives instructions, performs those instructions, and is capable of providing an indication of its activity level (for example, event counters).

The electronic voltage regulator (EVR) 210 generally corresponds to the inner control loop of FIG. 1. EVR 210 receives data from TLP 124, where the data indicates that Vref should be adjusted up or down according to an expected load change.

In this example, load 122 receives Voutput from EVR 210. EVR 210 attempts to hold Voutput substantially constant, but increases in activity at load 122 may cause an increase in current drawn from EVR 210, and an increase in current may cause Voutput to temporarily droop. Similarly, a decrease in activity at load 122 may cause a decrease in current drawn from EVR 210, thereby causing Voutput to temporarily overshoot. The outer control loop of FIG. 2 uses event counters from load 122 to predict whether current will increase or decrease, and then it manipulates Vref to proactively counteract undershoot or overshoot according to the prediction of current increase or decrease.

For instance, if TLP 124 predicts that the load will increase in activity, thereby increasing the current drawn from EVR 210, TLP 124 may cause EVR 210 to adjust Vref up incrementally to minimize droop at Voutput. Continuing with the example, if TLP 124 predicts that the load will decrease in activity, TLP 124 may cause EVR 210 to adjust Vref down incrementally to minimize overshoot at Voutput.

As discussed further with respect to FIG. 3, TLP 124 is a logic circuit which receives the event counters from load 122 and uses an adaptive control algorithm to predict whether the load is expected to increase or decrease during the next few clock cycles. One example of an adaptive control algorithm is a proportional-integral-derivative (PID) control loop feedback mechanism. However, the scope of embodiments is not limited to PID only, as any appropriate adaptive control algorithm may be used in some embodiments. For instance, if enough computing power is available, a neural network could also be used as an adaptive control algorithm that may predict changes in load.

As shown in FIG. 2, load 122 provides event counters to TLP circuit 124. In this embodiment, event counters include digital information that is generated by load 122 and is indicative of the activity of its internal logic operations. For example if load 122 has adding logic, shifting logic, and multiplying logic, each one of the different logic components may include its own register storing a value that is incremented each time its respective logic component performs an instruction. That is just an example, of course, as a given load may include counters distributed in any appropriate manner around the logic. Values of the counters may be read out every clock cycle, or every N clock cycles, or otherwise as appropriate.

Some operations may be more computationally intensive than others. For example, multiplication is usually more computationally intensive than addition. Thus, a single operation performed by a multiplication logic unit may use more energy than a single operation performed by an addition logic unit. Some embodiments may therefore take account of such differences by, for example, multiplying counters of more computationally-intensive operations. In any event, load 122 passes data that is indicative of its computational activity to the TLP circuit 124. Event counters are one example of such data, and other embodiments may use any appropriate kind of data that is indicative of computational activity at load 122.

Continuing with the example of FIG. 2, TLP circuit 124 provides data to EVR 210 to instruct EVR 210 to adjust the value of Vref up or down. In this example, TLP circuit 124 outputs digital data indicative of a number of units by which Vref should be adjusted. The digital data is received by, for example, DAC 120 (FIG. 1), which then adjusts the value of Vref up or down as appropriate.

In another embodiment, TLP circuit 124 outputs data that is indicative of the value of Vref itself, rather than being indicative of a change in Vref. Either technique is within the scope of the embodiments. Furthermore, while FIG. 1 shows that the outer control loop adjust the value of Vref, other embodiments may operate differently. For example, some embodiments may add or subtract voltage at the output of the buck converter 110 to preemptively reduce droop or overshoot, rather than adjusting the value of Vref.

FIG. 3 is an illustration of an example method 300 for proactively supplying voltage tuning, adapted according to one embodiment. Method 300 may be performed, for example, by a logic unit such as TLP circuit 124 of FIGS. 1 and 2. In this example embodiment, the method 300 is performed with respect to a voltage regulator that is either internal to or external to a system-on-a-chip (SoC). The SoC includes a load, and as the load operates its power consumption goes up and down according to the number of instructions and type of instructions that it is executing at any given time. The TLP circuit that performs method 300 is in a control loop, such as that shown in FIGS. 1 and 2, and it predicts power consumption at the load and adjusts a reference voltage or an output voltage of the voltage regulator according to its prediction.

Method 300 begins at action 302, which indicates that the various actions take place every clock cycle. In one embodiment, the TLP circuit and the load both operate at 1 GHz, whereas the voltage regulator operates at a slower rate, such as 250 MHz. Of course, these numbers are just examples, and the scope of embodiments is not limited to any particular clock rate for the load, the TLP circuit, or the voltage regulator.

At action 304, the TLP circuit obtains event counters from the load. In this example, the load includes a number j of event counters, and at action 304 the TLP circuit receives j event counters for that particular clock cycle ($\alpha j(i)$ are event counters at clock cycle i).

At action 306, the TLP circuit calculates multiple values. $\beta(i)$ represents an aggregate value of the counters for that particular clock cycle i. In this example, $\beta(i)$ is analogous to an indication of an amount of power consumed by the load during the clock cycle i, assuming that each event counter is proportional to an amount of power consumed.

The TLP circuit also calculates $\Delta\beta(i)$, which is a difference in the aggregate event counters at the present clock cycle and one clock cycle previous. In this example, $\Delta\beta(i)=\beta(i)-\beta(i-1)$ indicates the event delta, where $\Delta\beta>0$ indicates a load current increase, $\Delta\beta=0$ no change, but a change in the direction would normally be expected, (increase to decrease or vise-versa), $\Delta\beta<0$ indicates a load current decrease.

The TLP circuit also calculates $\Delta L(i+1)$, according to the PID algorithm shown in FIG. 3. $\Delta L(i+1)$ represents a prediction regarding the amount of increase or decrease in the current that is expected to be consumed by the load in the immediately subsequent clock cycle. In this embodiment, the values of the different PID coefficients (K) are known beforehand. For example, it is expected that each voltage regulator can either be tested or simulated, and using trial and error, the testing or simulation may find the three PID coefficients that provide the best curve fitting for that voltage regulator. Continuing with the example, as the load runs during mission mode, the TLP circuit uploads the PID coefficients from memory and applies them during method 300.

After the TLP circuit calculates $\Delta L(i+1)$, it then calculates $L(i+1)$, which is the total amount of current that is expected to be consumed by the load in the immediately subsequent clock cycle based on the predicted current change ($\Delta L(i+1)$). Then, it calculates $V(i+1)$, which is an indication of the reference voltage Vref that is expected to be appropriate to minimize droop or overshoot during the next clock cycle. Since power is equivalent to voltage times current, and since the voltage is maintained substantially the same value, then $V(i+1)$ is proportional to $L(i+1)$ in the first order of accuracy. In other words, in this example, $V(i+1)$ may be calculated by multiplying $L(i+1)$ by a coefficient, where that coefficient largely depends upon the topology and design of the voltage regulator. Thus, the relationship between $L(i+1)$ and $V(i+1)$ may also be known beforehand by testing or simulation and then saved in memory and uploaded to the TLP during operation of method 300.

At action 308, the clock cycle increments to the immediately subsequent clock cycle, i+1. At action 310, method 300 either performs actions 304 and 306 again or moves to action 312, depending upon whether a number of clock cycles n has been met. As noted above, the TLP circuit and the voltage regulator may operate at different clock speeds. In an example in which the TLP and the load operate at 1 GHz and the voltage regulator operates at 250 MHz, n may be set at four. Accordingly, method 300 would update the reference voltage Vref of the voltage regulator every four clock cycles. This is just an example, though, as various embodiments may set n at any number appropriate for updating the voltage regulator.

Actions 310 and 312 may be performed in any appropriate manner to account for the fact that the TLP circuit and the voltage regulator operate at different speeds. Method 300 shows that the TLP circuit calculates $V(i+1)$ every clock cycle but only updates the voltage regulator every n clock cycles. Some embodiments may average the value of $V(i+1)$ over n clock cycles or perform some other filtering over the number of clock cycles. On the other hand, some embodiments may simply disregard three of the calculations of $V(i+1)$ and keep one out of four. The scope of embodiments is not limited to any particular way of accounting for the difference in speeds of the TLP circuit and the voltage regulator.

At action 312, the TLP circuit updates the voltage reference Vref at the voltage regulator by sending data indicative of either a change in the voltage reference or a value of the voltage reference that corresponds to the calculated $V(i+1)$. In any event, the TLP circuit causes the voltage regulator to either increase or decrease the voltage provided by the voltage regulator to the load to counteract either a droop or overshoot that is predicted according to the PID algorithm. In some clock cycles, it is possible that the PID algorithm may predict no increase or decrease in current consumption by the load, in which case action 312 may cause no change in updating the voltage regulator. At action 314, the clock cycle increments by one, and method 300 starts over.

The scope of embodiments is not limited to the specific method shown in FIG. 3. Other embodiments may add, omit, rearrange, or modify one or more actions. For instance, method 300 may include some other adaptive control algorithm rather than the particular PID algorithm that is described here. In fact, any appropriate adaptive control algorithm that can use data indicative of computational activity from a load to predict a voltage increase or decrease that can be used to minimize a droop or overshoot may be implemented in various embodiments.

FIG. 4 is a chart illustrating an example number of clock cycles according to one embodiment of implementing method 300. For simplicity of illustration, the example of FIG. 4 only includes the proportional part of the PID algorithm, but other embodiments may use the integral and differential parts of the PID algorithm as well. Furthermore, the chart of FIG. 4 assumes that the voltage regulator is updated at each clock cycle; however, that differs from the embodiment of FIG. 3. In other words, the example of FIG. 4 is a generalized illustration to assist in understanding, but when the disclosure is implemented in a system-on-a-chip, the calculations may be more complex than those shown in FIG. 4.

During the first clock cycle the TLP circuit calculates $\Delta\beta(i)$ as 2, where a positive value indicates a load current increase. The TLP circuit then calculates $\Delta L(i+1)$ as a 4% increase and $\Delta V(i+1)$ as an increase of two units. In this example, the values shown in the column corresponding to $\Delta V(i+1)$ are digital values that can be expressed to a DAC (such as DAC 120 of FIG. 1) to indicate a change to be applied to Vref.

$\Delta M(i+1)$ is a change in actual current from the previous clock cycle to the present clock cycle, and $\Delta E$ is a difference between predictive load current and actual for the current clock cycle, where $\Delta E=L(i)-M(i)$. Since it is the first clock cycle in this example, $\Delta M(i)$ and $\Delta E$ are not applicable.

During the second clock cycle, $\Delta V(i+1)$ is calculated as zero, meaning that no additional voltage is predicted to be needed for the immediate subsequent clock cycle. The value of $\Delta M(i)$ is positive, thereby indicating that the current actually increased from clock cycle to clock cycle, and the value of $\Delta E$ indicates that the predictive load current was 2% higher than the actual measured load current for that cycle.

During the third clock cycle, $\Delta V(i+1)$ is calculated as one, thereby indicating that it is predicted that one unit of additional voltage should be applied in the fourth clock cycle. The value of $\Delta E$ being zero indicates that the system accurately predicted the additional voltage to be used during the third clock cycle (when it made the prediction during the second clock cycle).

During the fourth clock cycle, $\Delta V(i+1)$ is calculated to be four units, which indicates that the TLP circuit predicts a relatively large increase in current for the fifth clock cycle. Also, the $\Delta E$ value of −2% indicates that the TLP circuit under predicted the amount of voltage to be used during the fourth clock cycle (when it made the prediction during the third clock cycle).

It should be noted that $\Delta E$ and $\Delta M(i)$ are indicators of how well the TLP circuit predicted the voltage expected to be used to minimize droop or overshoot, but in a system in which the PID coefficients are held constant, such indicators may be of little or no use. Thus, some real world systems that use static PID coefficients may not calculate $\Delta E$ or $\Delta M(i)$.

An advantage of some embodiments is that they may provide proactive supply voltage tuning based on transient load prediction. Conventional systems, by contrast, provide a reactive tuning based on observed current readings. However, such conventional systems are already experiencing a droop or an overshoot by the time the current value is detected. Embodiments described herein may instead use an adaptive control algorithm to attempt to predict when droop or overshoot may be likely and to apply a change in voltage to the regulator in response to that prediction to ameliorate the droop or overshoot before it occurs. In some embodiments, this may provide for a minimization of droop and overshoot compared to conventional solutions. It is generally understood that overshoot and undershoot waste power, so embodiments that minimize overshoot and undershoot may save power. Additionally, undershoot may affect performance of a digital circuit, and overshoot may potentially damage a circuit, so minimization of this phenomenon may also improve operation of the circuit.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A circuit comprising:
   a voltage regulator configured to maintain an output voltage;
   a load in communication with the voltage regulator and configured to receive the output voltage, the load further configured to perform logic functions and to output data indicating computational activity at the load;
   a first feedback loop in communication with the output voltage and an input of the voltage regulator; and
   a second feedback loop in communication with the load and the voltage regulator and including a transient load current prediction circuit configured to calculate a predicted transient load current from the data indicating computational activity and to manipulate the output voltage in response to the predicted transient load current, wherein the data indicating computational activity includes event counters from the load, and further wherein the transient load current prediction circuit is configured to calculate the predicted transient load current by calculating a difference in aggregate event counters at a present clock cycle and at a previous clock cycle and applying coefficients to the difference in aggregate event counters.

2. The circuit of claim 1, wherein the load comprises at least one of a graphics processing unit (GPU), a central processing unit (CPU), and a modem.

3. The circuit of claim 1, further comprising a digital to analog converter (DAC) configured to receive an output from the transient load current prediction circuit and to change a value of a reference voltage of the voltage regulator in response to the output from the transient load current prediction circuit.

4. The circuit of claim 1, wherein the voltage regulator comprises:
   a pulse width modulation (PWM) controller configured to receive a reference voltage and output a pulse width modulated signal in response to the reference voltage; and
   a synchronous buck converter configured to receive the pulse width modulated signal and to convert an input voltage to the output voltage in accordance with a duty cycle of the pulse width modulated signal.

5. The circuit of claim 4, wherein the first feedback loop comprises a signal path from an output of the synchronous buck converter to the PWM controller, wherein the PWM controller is configured to adjust the duty cycle of the pulse width modulated signal in accordance with the output voltage and the reference voltage.

6. The circuit of claim 1, wherein the voltage regulator comprises a buck converter.

7. The circuit of claim 1, wherein a first one of the event counters comprises a counter that is incremented up each time an adding instruction is performed at the load.

8. The circuit of claim 1, wherein a first one of the event counters comprises a counter that is incremented up each time a multiplication instruction is performed at the load.

9. A method comprising:
at a voltage regulator circuit, maintaining an output voltage of the voltage regulator circuit in a first feedback loop;
powering a load with the output voltage, wherein the load includes a processing unit that generates event counters indicating an amount of activity by the processing unit;
receiving the event counters from the load;
calculating a predicted value for load current, wherein the predicted value is based at least in part on the event counters, further wherein calculating the predicted value for load current comprises calculating a difference in aggregate event counters at a present clock cycle and at a previous clock cycle and applying coefficients to the difference in aggregate event counters; and
manipulating the output voltage in response to the predicted value for load current.

10. The method of claim 9, wherein manipulating the output voltage comprises:
increasing the output voltage in response to an increase in the predicted value for load current; and
decreasing the output voltage in response to a decrease in the predicted value for load current.

11. The method of claim 9, wherein calculating the predicted value for load current comprises:
calculating a value indicating a change in the load current;
applying the value to a Proportional Integral Differential (PID) curve fitting function that provides the predicted value for load current.

12. The method of claim 9, further comprising:
maintaining the output voltage in the first feedback loop in response to a difference between the output voltage and a reference voltage; and
calculating a change in value of the reference voltage in response to the predicted value for the load current, the change in value of the reference voltage being calculated to hold the output voltage steady as current at the load changes according to the predicted value for the load current.

13. The method of claim 12 further comprising:
sending a digital output, based on the calculated change in value of the reference voltage, to a digital analog converter (DAC) that outputs the reference voltage.

14. The method of claim 9, wherein manipulating the output voltage comprises:
manipulating a value of a pulse width modulated signal that regulates the output voltage.

15. The method of claim 9, wherein manipulating the output voltage comprises:
adding or subtracting voltage at an output of the voltage regulator.

16. The method of claim 9, wherein the voltage regulator circuit comprises a buck converter.

17. The method of claim 9, wherein the load comprises at least one of a graphics processing unit (GPU), a central processing unit (CPU), and a modem.

18. The method of claim 9, wherein the coefficients comprise proportional-integral-derivative (PID) coefficients.

19. A circuit comprising:
means for regulating an output voltage produced from an input voltage;
means for receiving the output voltage to power logic functions and for outputting data indicating computational activity;
a first feedback loop coupling the output voltage to an input of the means for regulating the output voltage; and
a second feedback loop in communication with the means for receiving the output voltage and the means for regulating the output voltage, the second feedback loop including means for calculating a predicted transient load current from the data indicating computational activity and means for manipulating the output voltage in response to the predicted transient load current, wherein the data indicating computational activity includes event counters from the means for receiving the output voltage, and further wherein the calculating means are configured to calculate the predicted transient load current by calculating a difference in aggregate event counters at a present clock cycle and at a previous clock cycle and applying coefficients to the difference in aggregate event counters.

20. The circuit of claim 19, wherein the means for receiving the output voltage comprises at least one of a graphics processing unit (GPU), a central processing unit (CPU), and a modem.

21. The circuit of claim 19, wherein the means for manipulating the output voltage includes means for changing a value of a reference voltage of the means for regulating the output voltage in response to the means for calculating the predicted transient load current.

22. The circuit of claim 19, wherein the means for regulating the output voltage comprises:
means for producing a pulse width modulated signal in response to a reference voltage; and
a synchronous buck converter configured to receive the pulse width modulated signal and to convert the input voltage to the output voltage in accordance with a duty cycle of the pulse width modulated signal.

23. The circuit of claim 22, wherein the first feedback loop comprises a signal path from an output of the means for regulating the output voltage to the means for producing the pulse width modulated signal, wherein the means for producing the pulse width modulated signal is configured to adjust the duty cycle of the pulse width modulated signal in accordance with the regulated output voltage.

24. The circuit of claim 19, wherein means for producing the regulated output voltage comprises a buck converter.

25. A method comprising:
powering a computational load with a regulated output voltage from a buck converter;
receiving event counters from the computational load, wherein the event counters provide an indication of an amount of activity at the computational load;
generating a predicted value for transient load current at the computational load by use of the event counters, including calculating a difference in aggregate event counters at a present clock cycle and at a previous clock cycle and applying coefficients to the difference in aggregate event counters; and
changing a reference voltage of a control loop of the buck converter in response to the predicted value for transient load current.

26. The method of claim 25, wherein generating the predicted value for transient load current comprises:
- calculating a value indicating a change in transient load current at the computational load;
- applying the value to a Proportional Integral Differential (PID) curve fitting function that provides the predicted value for transient load current.

27. The method of claim 26, further comprising:
- calculating a change in value of the reference voltage in response to the predicted value for transient load current, the change in value of the reference voltage being calculated to hold the regulated output voltage steady as the transient load current changes according to the predicted value for the transient load current; and
- sending a digital output, based on the calculated change in value of the reference voltage, to a digital analog converter (DAC) that outputs the reference voltage.

28. The method of claim 25, wherein the computational load comprises at least one of a graphics processing unit (GPU), a central processing unit (CPU), and a modem.

* * * * *